（12）United States Patent
Nguyen (10) Patent No.: US 8,438,497 B2
(45) Date of Patent: *May 7, 2013

(54) METHOD AND SYSTEM FOR CONTINUING IN A SECOND GRAPHICS PAGE DISPLAY OF LIVE VIDEO PREVIOUSLY PRESENTED IN A FIRST GRAPHICS PAGE WHEN A USER NAVIGATES FROM THE FIRST GRAPHICS PAGE TO THE SECOND GRAPHICS PAGE

(75) Inventor: Nga Marie Nguyen, Carlsbad, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,053

(22) Filed: Aug. 26, 2011

(65) Prior Publication Data

US 2012/0036436 A1 Feb. 9, 2012

Related U.S. Application Data

(63) Continuation of application No. 09/835,101, filed on Apr. 13, 2001, now Pat. No. 8,046,795.

(60) Provisional application No. 60/197,297, filed on Apr. 14, 2000, provisional application No. 60/197,308, filed on Apr. 14, 2000.

(51) Int. Cl.
*G06F 3/048* (2006.01)
*G06F 17/00* (2006.01)
*G06F 3/00* (2006.01)
*G06F 13/00* (2006.01)
*G09G 5/00* (2006.01)

(52) U.S. Cl.
USPC ........... 715/790; 715/210; 715/760; 715/768; 725/43; 345/629; 345/635

(58) Field of Classification Search .................... 725/40, 725/43, 131; 715/210, 760, 768, 790; 345/629, 345/635
See application file for complete search history.

(56) References Cited

U.S. PATENT DOCUMENTS 5,982,445 A * 11/1999 Eyer et al. ...................... 348/461
6,928,624 B1 * 8/2005 Estipona ........................ 715/790

* cited by examiner

*Primary Examiner* — Hoang-Vu A Nguyen-Ba
(74) *Attorney, Agent, or Firm* — John L. Rogitz (57) ABSTRACT

A system and method for controlling a media generation system where a media event may be selected via a stateless software module, the system receiving a media event protocol file corresponding to the selected media event. The media generation system generates the media event based on the received media event protocol file.

7 Claims, 10 Drawing Sheets

METHOD AND SYSTEM FOR CONTINUING IN A SECOND GRAPHICS PAGE DISPLAY OF LIVE VIDEO PREVIOUSLY PRESENTED IN A FIRST GRAPHICS PAGE WHEN A USER NAVIGATES FROM THE FIRST GRAPHICS PAGE TO THE SECOND GRAPHICS PAGE

This is a continuation of and claims priority to U.S. patent application Ser. No. 09/835,101 filed Apr. 13, 2001 now U.S. Pat. No. 8,046,795 which claims priority to U.S. provisional application No. 60/197,297 filed on Apr. 14, 2000, which claims priority to U.S. provisional application No. 60/197,308 filed Apr. 14, 2000.

CROSS REFERENCE TO RELATED APPLICATIONS

This invention is related to Utility patent application Ser. No. 09/775,692, filed Feb. 2, 2001, and entitled "Web Browser Plug-in for TV", Provisional Patent Application 60/197,297, filed Apr. 14, 2000, and entitled "Contextual Web Page", Provisional Patent Application 60/197,848, filed Apr. 14, 2000, and entitled "User Interface for a Set-Top Box", Provisional Patent Application 60/197,308, filed Apr. 14, 2000, and entitled "Method for VOD", Provisional Patent Application 60/197,233, filed Apr. 14, 2000, and entitled "Cable Modem Set Top Box", Provisional Patent Application 60/182,822, filed Feb. 16, 2000, and entitled "Support for Television Viewing in a Standard Web Browser", Provisional Patent Application 60/180,085, filed Feb. 3, 2000, and entitled "Web Browser Plug-in for TV", Provisional Patent Application 60/197,234, filed Apr. 14, 2000, and entitled "Web Based EPG Support", Provisional Patent Application 60/197,320, filed Apr. 14, 2000, and entitled "Support for tuning while viewing a Web Based EPG", and Provisional Patent Application filed Jan. 30, 2001, 60/265,418, and entitled "Web Browser and Set Top Box Interface System and Method", each of which is hereby incorporated by reference for their teachings.

BACKGROUND OF THE INVENTION

1. Field of the Invention

This invention relates to controlling a system via a web browser, and more particularly to controlling a media generation system via a web browser.

2. Description of Related Art

As more people become familiar with Web Browser software environments, it has become desirable to incorporate Web Browser software application in systems or devices to control the operation of the system devices. In particular, it is desirable to control systems by navigating through a plurality of Web pages. Web Browser environments, however, are stateless because that do not differentiate web pages as navigation occurs. When a web browser is used to request a system or device to perform a particular action, several steps may be required. Meanwhile, a different web page could be accessed without completing the required steps and without knowledge of the previous request. Accordingly, a need exists for system that incorporate employ a Web browser to effectively control some or all functions of system.

SUMMARY OF THE INVENTION

The present invention includes a method and system for controlling a media generation system via a stateless software module. This is accomplished by employing a media event protocol file. In particular a user selectable media event in the stateless software module is generated. A media event protocol file for the selected media event is received. The media generation system is directed to generate the media event based on the media event protocol file.

The invention may also parse the media event protocol file. Then, the media generation system is directed to generate the media event based on the parsed media event protocol file. The stateless software module may be a Web browser. In this case, a user selectable link coupled to the media event in a page of a Web Browser is generated. Also, the media event protocol file for the selected media event is received from the selected link.

The media generation system may be a video generation system and the media event may be a video media event. Further, the media generation system may be a television set top box. In either case, the media event protocol file may include the screen location for the video media event within a page of the Web Browser. The media event protocol file may also include the height and width of the video media event within the page of the Web Browser. The media event protocol file may further include the channel location of the video media event.

In this invention, a media event handler software module may be evoked when the media event protocol file is received. The media event handler software module directs the media generation system to generate the media event based on the media event protocol file. The media event handler software module may parse the media event protocol file and direct the media generation system to generate the media event based on the parsed media event protocol file. It is noted that the media event handler software module may be a Web Browser plug-in.

In a further case, the stateless software module evokes the media event handler software module upon receiving the media event protocol file.

In a particular case, the invention includes a method and system for controlling a windowless television set top box. A user selectable link coupled to a video media event in a page of a Web Browser is generated. A video media event protocol file for the video media event is received from the selected link. The Web Browser evokes a media event handler plug-in upon receiving the video media event protocol file. The media event handler plug-in directs the media generation system to generate the video media event based on the media event protocol file. The media event handler plug-in may also parse the media event protocol file and directs the media generation system to generate the video media event based on the parsed media event protocol file.

BRIEF DESCRIPTION OF THE DRAWINGS

Like reference numbers and designations in the various drawings indicate like elements.

DETAILED DESCRIPTION OF THE PREFERRED EMBODIMENTS

Throughout the description, the preferred embodiment and examples shown should be considered as exemplars, rather than as limitations on the present invention.

Figure 10:
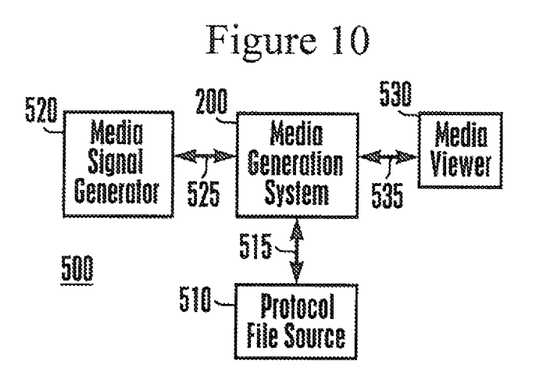
FIG. 10 is a block diagram of media generation architecture according to an embodiment of the present invention.

An overview of an application of the present invention is presented with reference to FIG. 10. FIG. 10 is a block diagram of exemplary media generation architecture 500 in which the present invention may be employed. The architecture 500 includes a media signal generator 520, a media generation system 200, a media viewer 530, and a protocol file source 510. As explained in detail below, the media generation system 200 generates a media event upon the election of a user via a Web based interface operating within the media generation system 200. The media generation system may receive a media signal related to the media event. The media signal generator 520 may generate the media signal and communicate the signal to the media generation system 200 via a link 525. The media signal generator may be any system that can produce a media signal including a satellite system, radio/television broadcast system, Internet system. Accordingly, the link 525 may be a satellite link, radio frequency link, and Internet link.

The media viewer 530 may be any device capable of converting the media event into a human perceptible format including computer, television, radio, and telephone. In one embodiment, the media viewer 530 may be part of the media generation system 200. As noted, the media generation system 200 ideally includes a Web based user interface. The user selects a media event for presentation via the media viewer 530 by generating a user selectable link on a web page corresponding to the media event. Upon the election of the media event, the media generation system 200 may need to perform multiple steps to generate the media event depending on the location of the media signal corresponding to the media event.

In a preferred embodiment when a user selects a link corresponding to the media event, the corresponding link transmits a session description protocol ("SDP") file to the media generation system 200. In the architecture 500, the SDP file is located at a protocol file source 510 and is transmitted to the media generation system 200 via the link 515. The protocol file source 510 may be a web based server, satellite signal provider, cable signal provider, and conventional radio/television provider. The link 515 may be similar to link 525. In some embodiments, the media signal generator 200 may be linked to protocol file source 510 or directly include the protocol the source 510. In one embodiment, the SDP file includes information about the selected media event where the media generation system 200 includes software for parsing the SDP file to determine how to generate the media event. The SDP file may also include information about how to present the media event in the media viewer 530. The SDP file enables the media generation system 200 to process/generate the media event while the user navigates the Web based interface to a different page where the new page may or may not refer to the pending media event.

Figure 1:
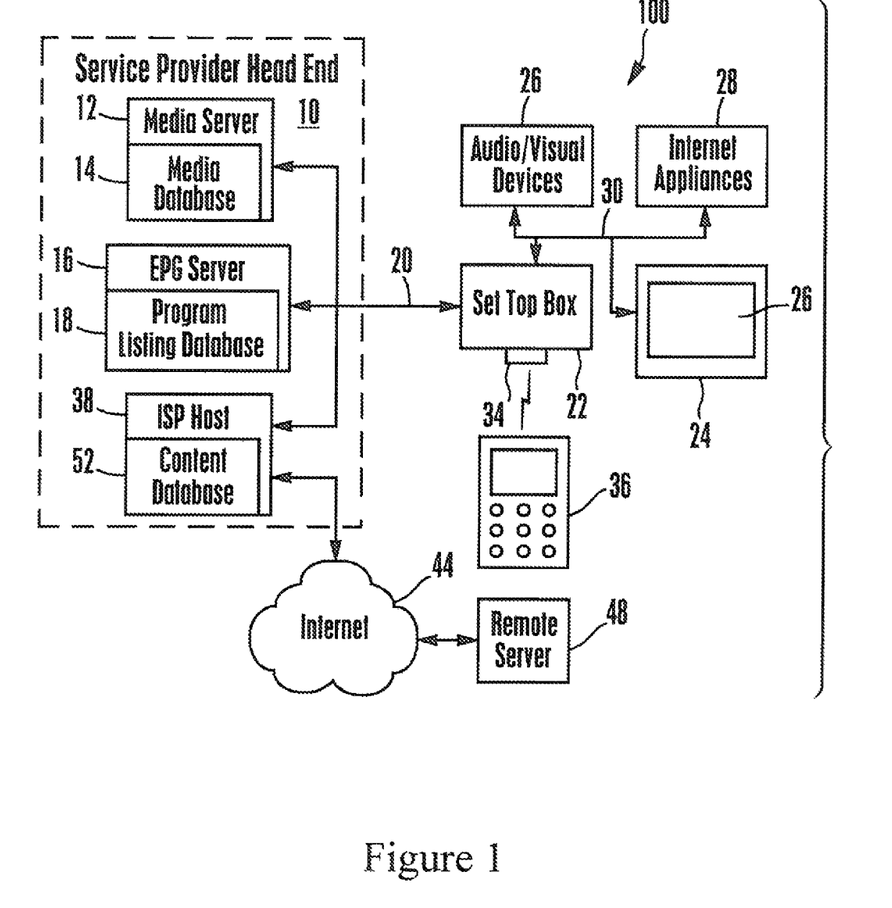
FIG. 1 is a block diagram digital cable television system in accordance with the present invention.

One exemplary media generation architecture is shown in FIG. 1. FIG. 1 is a block diagram for an exemplary interactive cable or satellite television (TV) architecture or system 100 in which the present invention may be employed. The system 100 includes a service provider head end 10, remote server 48, Internet 44, audio/visual devices 26, Internet appliances 28, television 24, set-top box ("STB") 22, and remote control 36. The head end of the service provider 10 includes a media server 12, EPG server 16, and ISP Host 38. The media server 12 of the head end 10 provides on demand movies and other programming such as interviews with actors, games, advertisements, available merchandise, associated Web pages, and other related content obtained from a media database 14. The electronic programming guide (EPG) server 16 includes a program listing database 18 for generating an EPG. The ISP host 38 includes a content database 52 and is coupled to remote servers 48 via the Internet 44. The remote servers may include another content such as video on demand ("VOD") content or EPG content. The EPG content received from the remote server 48 may be used to populate or update the program listing database 18 of the EPG server 16. The ISP host 38 includes protocols that enable communication between remote servers 48 via the Internet 44. Accordingly, the service provider head end may represent a media signal generator 520 of FIG. 10.

The media server 12 and EPG server 10 are coupled by a transmission medium 20 to the set top box (STB) 22. The transmission medium 20 (link 525 in FIG. 10) may include, for example, a conventional coaxial cable television network, a fiber optic cable network, telephone system, twisted pair, a satellite communication system, a radio frequency (RF) system, a microwave system, other wireless systems, a combination of wired and wireless systems or any of a variety of known electronic transmission mediums. In the case of a coaxial cable television network, transmission medium 20 is commonly realized at the subscriber's premises as a coaxial cable that is connected to a suitable cable connector at the rear panel of the STB 22. The STB 22 represents the media generation system 200 shown in FIG. 10.

As noted, system 100 further includes a TV 24, such as a digital television. The TV 24 includes a display 26 for displaying programming, an EPG, web browser and other content. The TV 24 represents a media viewer 530 as shown in FIG. 10. The STB 22 may be coupled to the TV 24 and various other audio/visual devices 26 and Internet Appliances 28 by an appropriate interface 30 (link 535 in FIG. 10), which can be any suitable analog or digital interface including an Institute of Electrical and Electronics Engineers (IEEE) 1394 standard interface, S-Video, Component Video. NTSC, PAL, or other analog television interface.

Set-top box 22 can generally provide for bi-directional communication over a transmission medium 20 in the case of a cable STB 22. In other embodiments, bi-directional communication can be effected using asymmetrical communication techniques possibly using dual communication media, one for the uplink and one for the downlink. In any event, the STB 22 can have its own Universal Resource Locator (URL) assigned thereto to provide for direct addressing by the head end and users of the Internet. In the case of a Direct Satellite System (DSS), the STB 22 is often referred to as an Integrated Receiver Decoder (IRD). The transmission medium is a satellite transmission at an appropriate microwave band. A satellite dish antenna with an integral Low Noise Block (LNB) is used to receive such transmissions. A down-converter converts the received signal to a lower frequency (baseband frequency) for processing by the STB 22.

Figure 2:
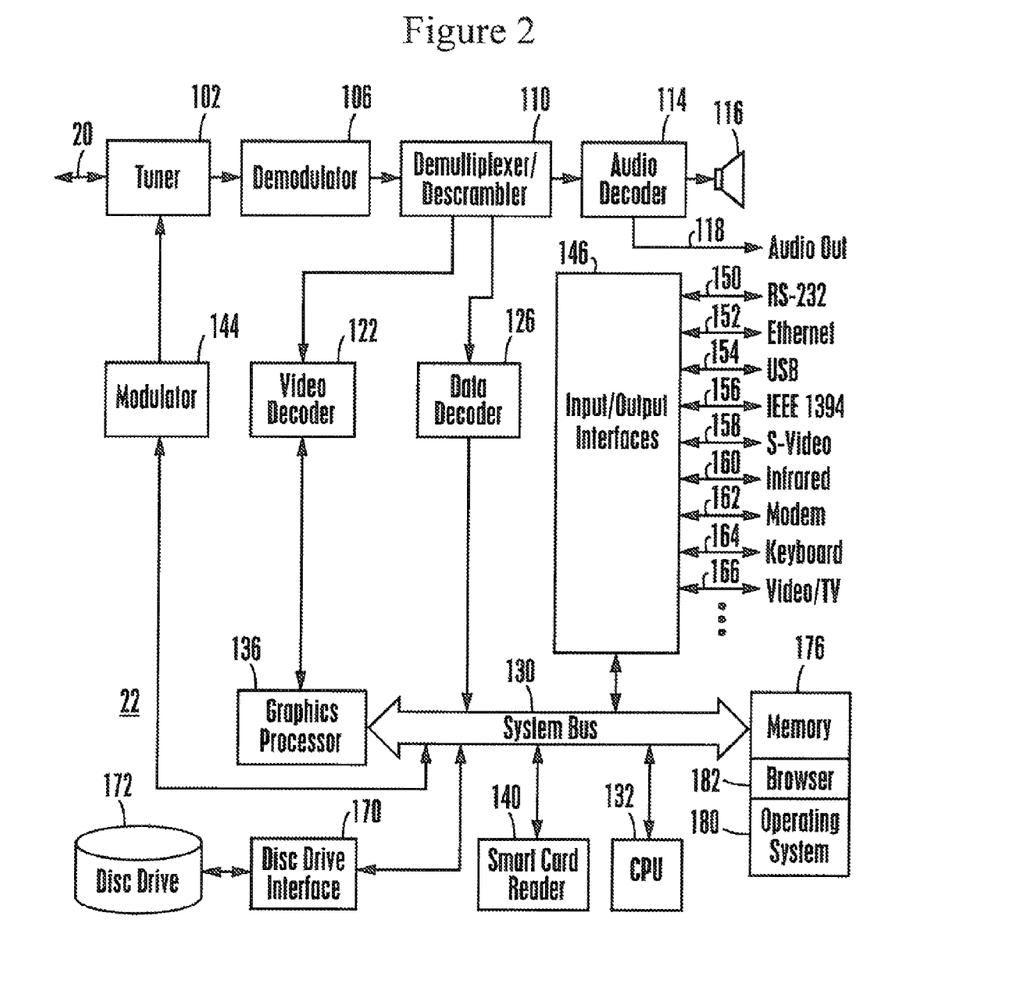
FIG. 2 is a block diagram of the set top box shown in FIG. 1.

As shown in FIG. 2, the STB 22 may include a central processing unit (CPU) 132 and memory such as Random Access Memory (RAM) 176, Read Only Memory (ROM), flash memory, mass storage such as a hard disc drive 172, floppy disc drive, optical disc drive or may accommodate other electronic storage media. Such memory and storage media is suitable for storing data as well as program instructions for processes to be executed by the CPU. Information and programs stored on the electronic storage media or memory may also be transported over any suitable transmission medium such as that illustrated as 20. STB 22 may include circuitry suitable for audio decoding and processing 114, the decoding of video data 122 compressed in accordance with a compression standard such as the Motion Pictures Experts Group (MPEG) standard and other processing. It is noted that these components may be incorporated into the TV 24, eliminating the STB 22. In addition, a computer may substitute the TV 24 and STB 22. The computer may include a vary of devices capable of generating video media including a tuner card coupled to a digital network, cable television network, or DSS network.

It is noted that the STB 22 may be coupled to additional devices such as a personal computer, video cassette recorder, camcorder, digital camera, personal digital assistant and other audio/visual or Internet related devices (not shown). In addition, a data transport architecture, such as that set forth by an industry group which includes Sony Corporation and known as the Home Audio-Video Interoperability ("HAVi") architecture may be utilized to enable interoperability among devices on a network regardless of the manufacturer of the device. This architecture may be used to create a home network system between electronic devices and Internet appliances. The STB 22 may run an operating system suitable for a home network system such as Sony Corporation's Aperios™ real time operating system. Other operating systems could also be used.

As shown in FIG. 1, the STB 22 includes an infrared (IR) receiver 34 for receiving IR signals from an input device such as the remote control 36. Alternatively, it is noted that many other control communication methods may be utilized besides IR, such as wired or wireless radio frequency, etc. In addition, it can be readily appreciated that the input device 36 may be any device suitable for controlling the STB 22 such as a remote control, personal digital assistant, laptop computer, keyboard, or computer mouse. In addition, an input device in the form of a control panel located on the TV 24 or the STB 22 can be provided.

The STB 22 may also be coupled to an independent service provider (ISP) host 38 by a suitable connection including dial-up connections, DSL (Digital Subscriber Line) or the same transmission medium 20 described above (e.g. using a cable modem) to, thus, provide access to services and content from the ISP and the internet. STB 22 may also be used as an internet access device to obtain information and content from remote servers such as remote server 48 via the Internet 44 using host 38 operating as an Internet portal, for example. In certain satellite STB environments, the data can be downloaded at very high speed from a satellite link, with asymmetrical upload speed from the set-top box provided via a dial-up or DSL connection. In one embodiment, the ISP or remove server 48 may be a protocol file source 510 as shown in FIG. 10 with the corresponding link 515.

One configuration of a digital STB 22 is shown in detail in FIG. 2. The STB 22 includes a tuner 102, demodulator 106, demultiplexer/descrambler 110, audio decoder 114, modulator 144, video decoder 122, data decoder 126, I/O interfaces 146, system bus 130, graphics processor 136, memory 176, central processing unit ("CPU") 132, smart card reader 140, disc drive interface 170, and disc drive 172. A transmission medium 20, such as a coaxial cable, is coupled by a suitable interface to the tuner 102. Tuner 102 may include a broadcast in-band tuner for receiving content, an out-of-band ("OOB") tuner for receiving data transmissions and a return path timer for providing an OOB return path for outbound data (destined for example for the head end). A separate tuner (not shown) may be provided to receive conventional RF broadcast television channels. Demodulator 106 may demodulate any modulated information from the tuner 102 such MPEG-2 formatted data. The demultiplexer/descrambler circuit 110 separates the demodulated information into discrete channels of programming. The programming is divided into packets, each packet bearing an identifier called a Packet ID (PID) that identifies the packet as containing a particular type of data (e.g. audio, video, and data). The demultiplexer/descrambler circuit 110 also decrypts encrypted information in accordance with a decryption algorithm to prevent unauthorized access to programming content, for example.

Audio packets from the circuit 110 (those identified with an audio PID) are decrypted and forwarded to an audio decoder 114. The audio decoder 114 may be convert the audio packets to analog audio to drive a speaker system (e.g. stereo or home theater multiple channel audio systems) or other audio system 116 (e.g. stereo or home theater multiple channel amplifier and speaker systems) or may simply provide decoded audio out at 118. Video packets from the circuit 110 (those identified with a video PID) are decrypted and forwarded to the video decoder 122. Similarly, data packets from the circuit 110 (those identified with a data PID) are decrypted and forwarded to the data decoder 126.

The data decoder 126 transmits decoded data packets to the CPU 132 via the system bus 130. Video decode2 122 passes video data to the graphics processor 136. The graphics processor is a computer optimized to processes graphics information rapidly, in particular graphics intensive data associated with Internet browsing, gaming, and multimedia applications such as those associated with MHI:G (Multimedia and Hypermedia information coding Experts Group) set-top box applications. Graphics processor 136 is also coupled to the system bus 130 and operates under the control of CPU 132. It should be noted that the function of a graphics processor 136 may be unnecessary in set-top box designs having lower capabilities. Also the CPU 132 may function as a graphics processor in some applications.

The STB may include a smart card reader 140 for communicating with a so called "smart card", where the smart card leader 140 acts as a Conditional Access Module (CAM). In CAM systems the smart card reader may include a central processor unit (CPU) with associated RAM and ROM memory. Such smart card based CAMs are conventionally utilized for authentication of the user, of transactions carried out by the user, and of services and storage of cryptography keys. For example, the CAM may be used to provide the key for decoding incoming cryptographic data. STB 22 may operate in a bi-directional communication mode. Accordingly, data and other information may be transmitted from the head end 10 to the STB 22 and from the STB 22 using an out-of-band channel. In one embodiment, the data passes through the system bus 130, modulator 144, and the tuner 102 (operating as a return path OOB tuner) to the transmission medium 20. This enables the STB 22 user to send information to the head end 10, e.g., service requests or changes and registration information.

Set-top box 22 may include any of a plurality I/O (Input/Output) signals at I/O interface 146 for interconnection with other devices. By way of example, and not limitation, a serial RS-232 signal may be provided at port 150 to enable interconnection to any suitable serial device supported by STB 22's internal software. Similarly, communication with appropriately compatible devices can be provided via an Ethernet port 152, a USB (Universal Serial Bus) port 154, an IEEE 1394 (Firewire or I-Link) port 156, S-video port 158, or infrared port 160. These interfaces may be utilized to interconnect the STB 22 with any of a variety of devices such as storage devices, audio/visual devices 24, gaming devices (not shown), and Internet Appliances 28.

I/O interfaces 146 can include a modem port 162 to facilitate high speed or alternative access to the Internet or other data communication functions. In one preferred embodiment, modem port 162 includes a DOCSIS (Data Over Cable System Interface Specification) cable modem. This modem facilitates high speed network access over a cable system when port 162 is appropriately coupled to a transmission medium 20 embodied as a coaxial cable. A PS/2 or other keyboard/mouse/joystick coupled to port 164 may be used to enable data entry into the STB 22. STB 22 also may include a basic video output port 166 for direct connection to a television set such as 24. In one embodiment, Video output port 166 can provide composite video formatted as National Television System Committee ("NTSC") video. In some embodiments, the video output port 166 may be coupled directly to the graphics processor 136 or the demultiplexer/descrambler 110 rather than passing through the system bus 130 as illustrated in the exemplary block diagram. S-Video signals at output port 158 can be similarly provided without passing through the system bus 130 if desired in other embodiments.

The infrared port 160 may be embodied as an infrared receiver 34 as illustrated in FIG. 1. The infrared port 160 may receive commands from an infrared remote control 30, infrared keyboard or other infrared control device. Although not explicitly shown, front panel controls may be used in some embodiments to directly control the operation of the STB 22 through a front panel control interface coupled to the I/O interfaces 140. Selected interfaces such as those described above and others can be provided in STB 22 in various combinations as required or desired.

STB 22 may also include a disc drive interface 170 and disc drive mass storage 172 for storage of content and data as well as providing storage of programs operating on CPU 132. STB 22 may also include other storage mediums such as a floppy disc drive, CD ROM drive, CD R/W drive, DVD drive, and others. CPU 132 is coupled through the system bus 130 to the memory 170. Memory 170 may include any suitable memory technology including Random Access Memory (RAM), Read Only Memory (ROM), Flash memory, Electrically Erasable Programmable Read Only Memory (EEPROM), and others.

Figure 3:
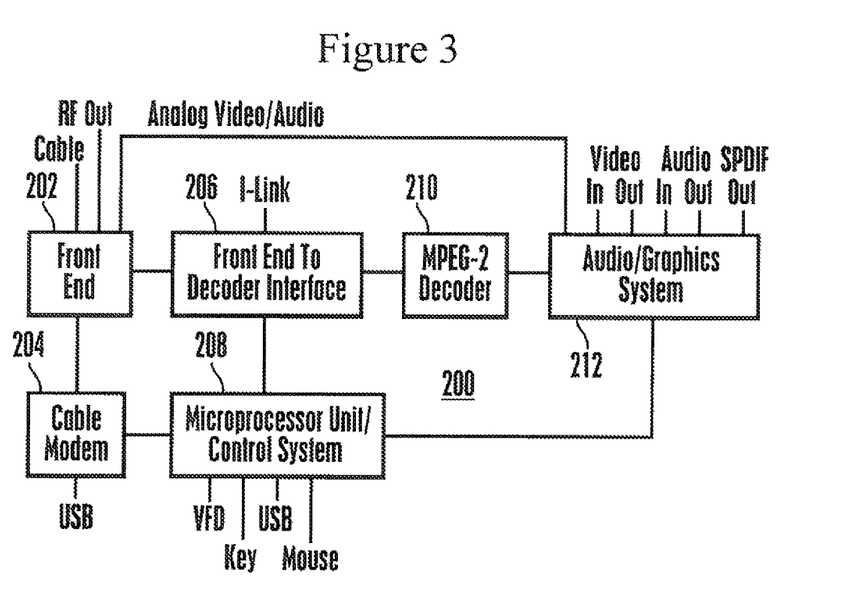
FIG. 3 is a block diagram of a set top box according to an embodiment of the present invention.
Figure 4:
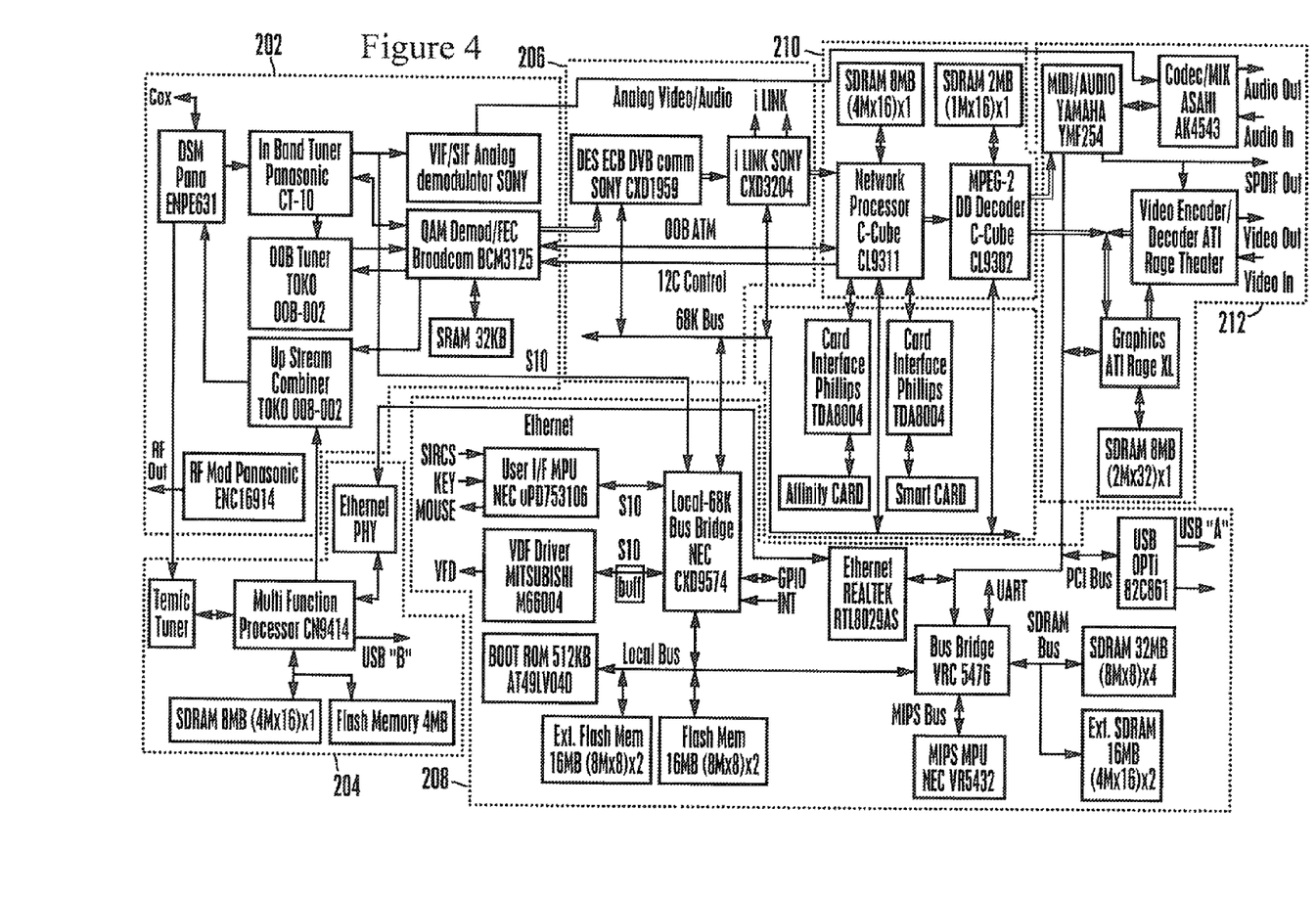
FIG. 4 is a detailed block diagram of the set top box of FIG. 3.

FIG. 3 is a basic block diagram of the media generation system in the form of an exemplary STB 200 capable of use with the present invention. A detailed block diagram of the STB 200 is shown in FIG. 4. STB 200 is described in detail in provisional Patent Application 60/197,233, filed Apr. 14, 2000, entitled "Cable Modem Set Top Box" which is incorporated by reference herein for its teachings on the STB 200. Accordingly, the STB 200 is only briefly described with reference to FIGS. 3 and 4. The STB 200 includes a front end 202, cable modem 204, front end to decoder interface 206, MPU/control system 208, MPEG-2 Decoder 210, and Audio/Graphics System 212. The front end 202 with a digital cable television provider (media signal generator 520 in FIG. 10) via a coaxial cable (link 525 in FIG. 10) coupled therein. The front end 202 could be modified to communicate with alternative digital or analog content providers. The front end to decoder interface 206 links the front end 202, MPU/control system 208, and MPEG-2 decoder 210. The interface 206 includes card readers and an iLink™ interface. The MPEG-2 decoder 210 receives MPEG-2 content from the front end 202 (via the interface 206), and decodes the MPEG-2 content into frames for processing by the Audio/graphics system 212. The microprocessor unit ("MPU")/control system 208 controls the primary operation of the STB 200. The system 208 includes a MPU that supports layers for drivers up to application program interfaces ("APIs") that control the interaction of the components of the STB 200.

The system 208 may receive control data from the front end 202 (via the interface 206) and send control data to the front end (and ultimately a content provider or media signal generator) via the cable modem 204 and front end 202. The cable modem 204 is coupled to the front end 202 and MPU/control system 208 and can retrieve and place digital data packets on the cable system (in this embodiment). The audio/graphics system 212 can receive video and audio content information from the front end (for analog video/audio), the MPEG-2 decoder (digital audio and video), and the MPU/control system 208.

Figure 5:
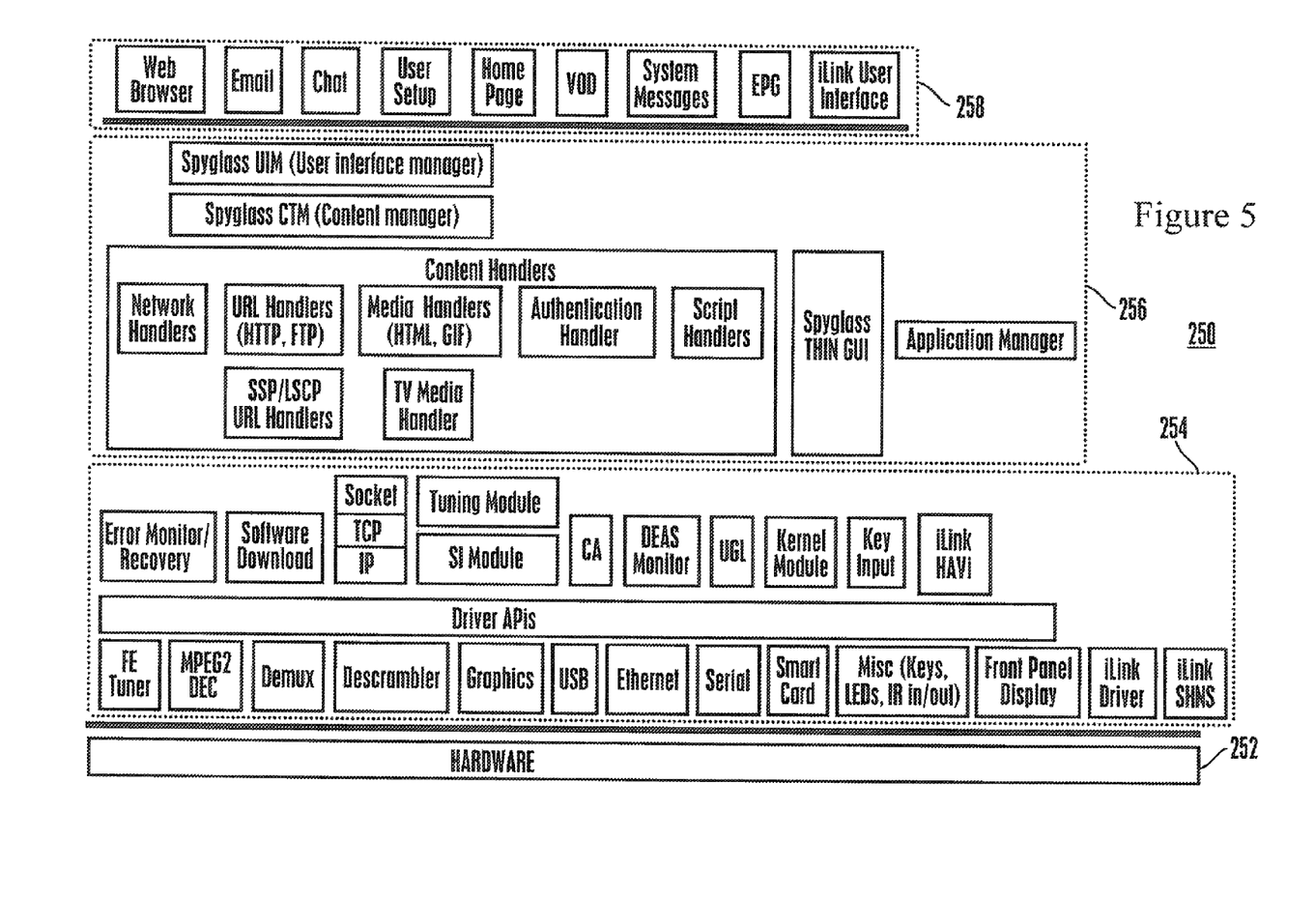
FIG. 5 is a block diagram of the software architecture of the set top box of FIG. 4.

A block diagram of the software architecture 250 for the STB 200 is shown in FIG. 5. The architecture 250 depicts the hardware layer 252, hardware layer interface/driver layer 254, middleware layer 256, and to local content/application layer 258. During normal operation of the STB 200, the driver APIs are loaded in the memory of the control system 208. The driver APIs enable communication of events between the MPU and the hardware modules of the STB 200. As shown in FIG. 5, the hardware modules include the Front Find Tuner, MPEG-2 Decoder, Demultiplexer. Descrambler, Graphics, Ethernet, Serial port, Smart Card, miscellaneous hardware including keyboard, light-emitting-diodes, infrared, and front panel display.

The middleware layer 256 includes a group of content handlers, spyglass content manager, spyglass user interface manager, spyglass thin graphical user interface ("GUI"), and application manager. The middleware layer 256 enables the handlers and managers to run on multiple platforms with little regard for the actual operating system in place. At the top layer is the application layer when user applications reside (e.g. web browser, email, Chat, user setup, home page of STB. Video On Demand (VOD), EPG, and iLink user interface). In the present invention, the browser enables Hyper Text Markup Language ("HTML") based pages or screens and browser related pages to be formatted for graphic generation by the audio/graphics system 212. The browser also serves as a jumping point for a mechanism for viewing video media content (a selected media event) received from the front end 202 and MPEG-2 decoder 210.

Figure 6A:
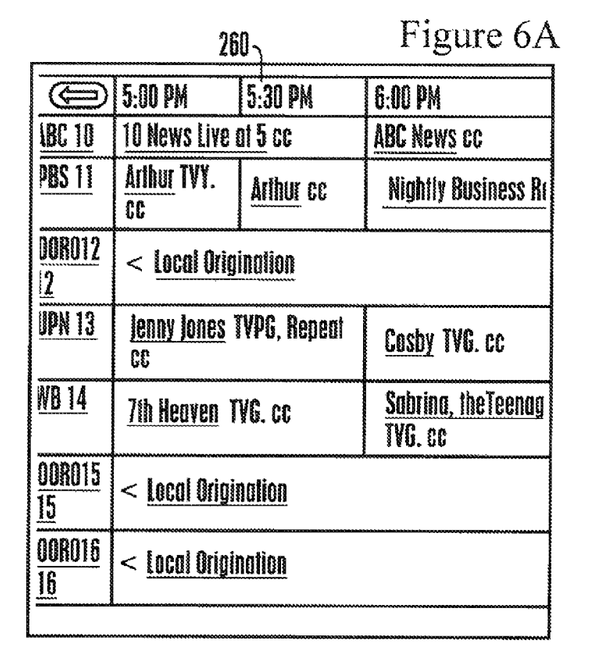
FIGS. 6A to 6D are diagrams of browser and video content screen configurations in accordance with the present invention.
Figure 7:
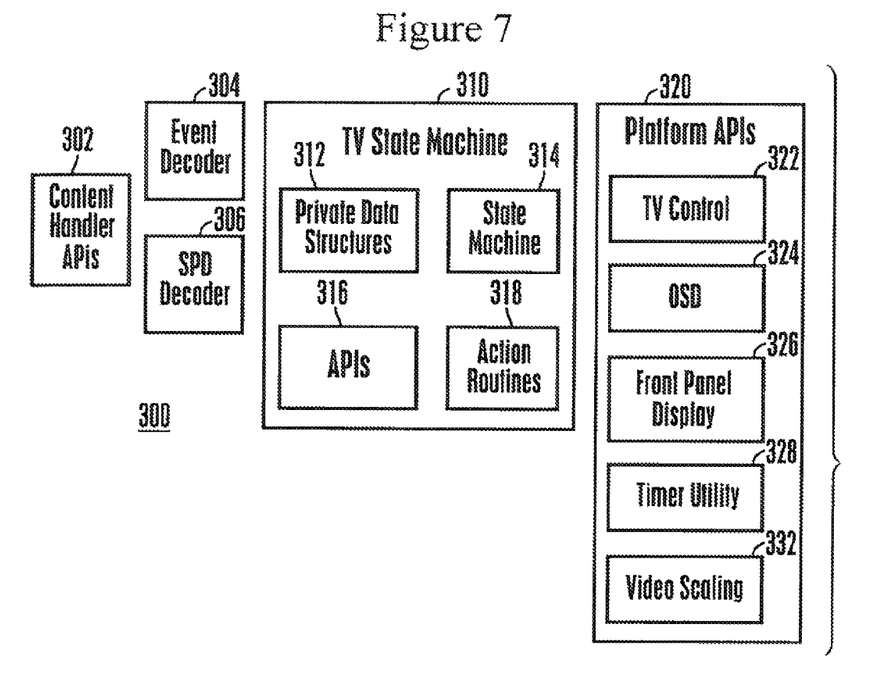
FIG. 7 is a block diagram of the software architecture of the TV media handler of the set top box of FIG. 4.
Figure 8:
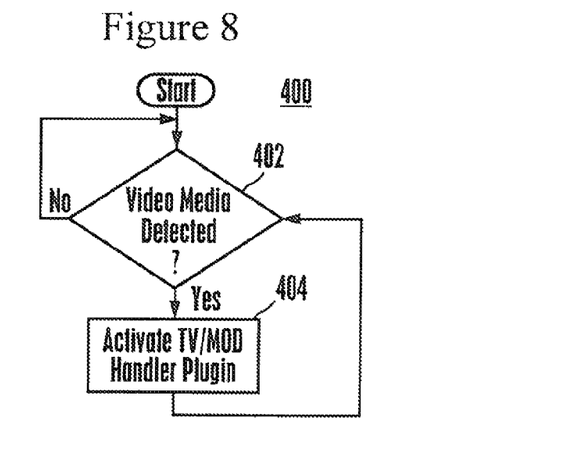
FIG. 8 is a flowchart of a process of invoking the TV media handler in accordance with the present invention.

FIG. 6A is an image of a screen generated by the STB 200. The screen includes a HTML page 260. In this case, the page represents EPG from http://tv.yahoo.com. In the STB 200, when a Uniform Resource Locator ("URL") is selected within the page 260 that returns with a header that indicates video media content, the STB 200 invokes a browser plug-in in the middleware termed the TV media handler (in FIG. 5). A block diagram of the software architecture of the TV media handler 100 is shown in FIG. 7. As shown in FIG. 7, the TV media handler 300 includes content handler APIs 302, an event decoder 304, a SDP decoder 306, a TV state machine 310, and platform APIs 320. This process 400 is shown in the flowchart of FIG. 8. In particular, the browser application detects a URL with a video media type at step 402. Then the browser application invokes the TV media handler plug-in at step 404 via a call to the content handler.

Figure 6B:
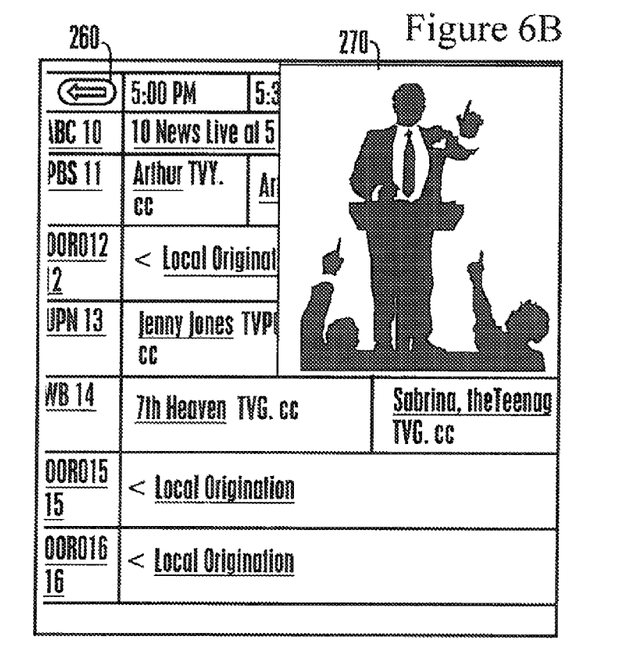
Figure 6C:
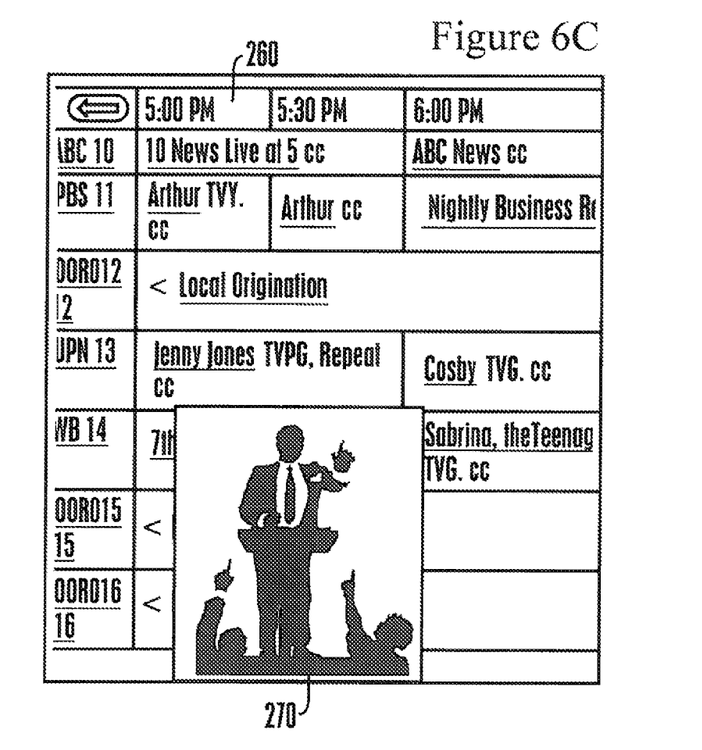
Figure 6D:
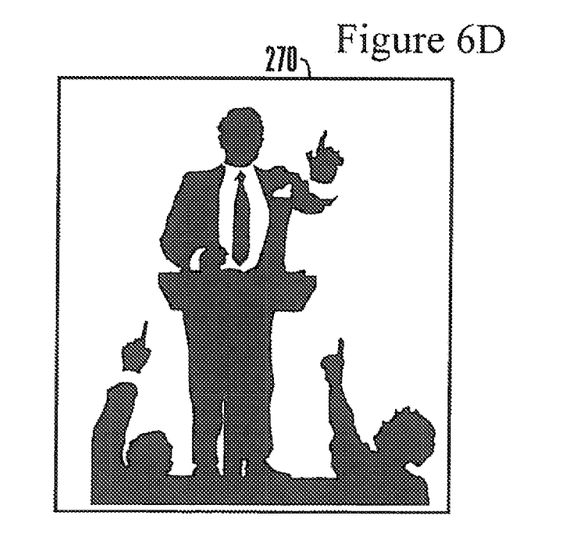

In summary, the TV media handler 300 is a content handler in the middleware layer 256 that is responsible for controlling a region of the screen and painting that region with a transparent color to allow an underlying video frame or layer to show through the browser or HTML layer or frame based on data returned with the URL indicating video media content. The TV media handler 300 communicates with the STB 200 front end 202 and audio/graphics system 212. In the invention, when the handler 300, a web browser plug-in, is instantiated via a URL request that returns the header for video/mpeg media content (thus indicating a media event has been selected), data in the format of a Session Description Protocol ("SDP") file is also received from the correspond link and protocol file source. The SDP file indicates parameters for the video session (layer), i.e., the media event to be presented via the media viewer 530 (FIG. 10). These parameters may include the channel number to be selected by the front end 202, the size of the video layer within the HTML layer, and the location of the video layer within the HTML layer. For example, FIG. 6B represents a video session where the video layer is positioned in the upper right corner of the HTML layer. FIG. 6C represents a session where the video layer (media event) is positioned in the lower middle of the HTML layer. FIG. 6D represents a session where the video layer is positioned over the entire the HTML layer.

In this embodiment, the STB 200 generates a HTML layer and video layer and the audio/graphics system 212 is directed to draw these layers. In FIG. 6A, the HTML layer consists of the entire screen. In this case, the graphics system 212 is not directed to clear a section of the HTML layer for the video layer. In FIG. 6B, the video layer consumes a segment of the upper right corner of the screen. In this case, the TV media handler directs the corresponding section of the HTML layer to be cleared and drawn with a transparent color by the graphics handler. The handler 300 also directs the front end to tune to the appropriate channel for the video signal for the video layer. The media handler 300 also directs the graphics system 212 to size the video layer to fit within the transparent window of the HTML layer.

When the handler 300 receives the SDP file, the handler parses information in the file using the SPD decoder 306. Based on the parsed data, the handler makes calls to the TV State Machine 310 to perform the appropriate actions as mandated by the SDP file. Accordingly, the media generation system (STB) 200 may generate the selected media event while the user may select to navigate to a different web page while the video section remains cleared in this embodiment. When the SDP file indicates that this instance is a VOD session, then media handler will communicate with the VOD server through the use of a special URL request. The VOD server acts a media signal generator 520 in this embodiment. The URL request generates URL handlers that will parse the request and communicate with the VOD system at the head end of the respective system to create a new session. The URL handlers will pass the information from the VOD (server) system back to the TV media handler.

Figure 9:
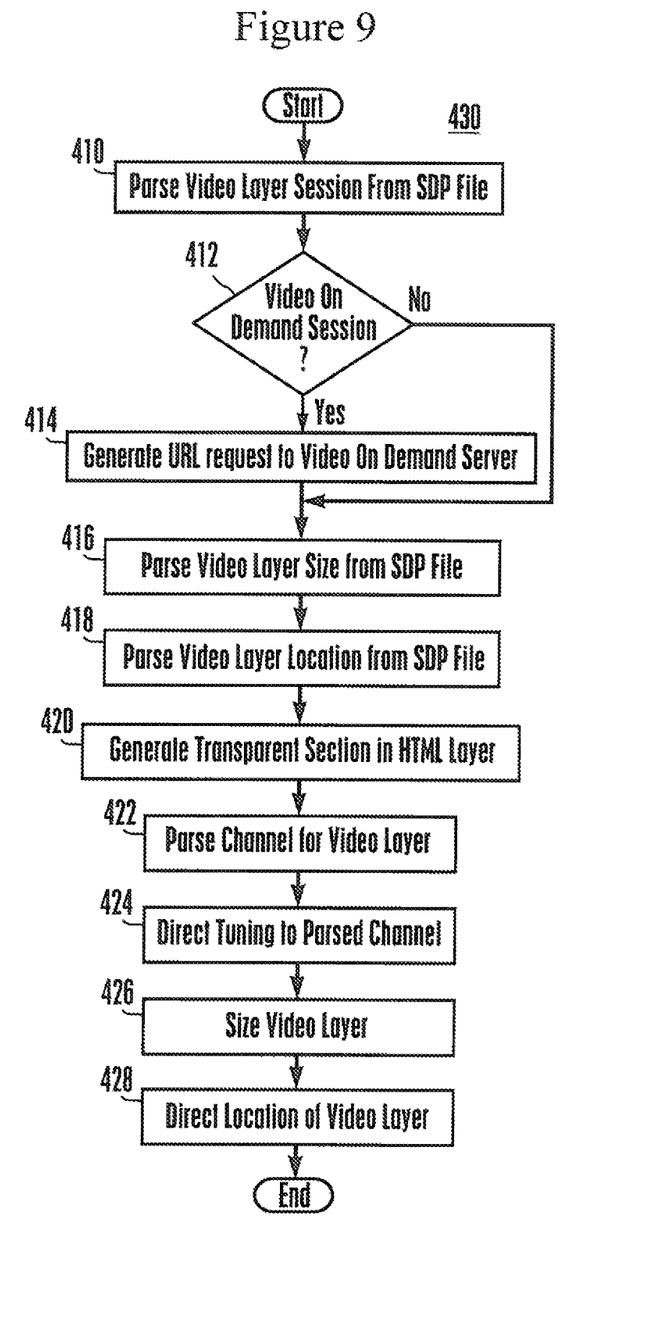
FIG. 9 is a flowchart of a TV media handler process in accordance with the present invention.

A flowchart of one process 430 executed by the TV media handler to handle media events is shown in FIG. 9. As shown in FIG. 9, at step 410, the handler 300 parses the video layer session from a received SDP file. The session indicates the source of the video signal to be shown in the video layer. The source may be directly tunable at the front end or may require a URL request to generate a new video stream to be transmitted to the STB 200 from the media signal generator 520 and retrieved by the front end 202 of the media generation system 200. Step 412 determines whether the session is a Video on Demand (VOD) session. When the SDP file indicates a VOD session, the handler 300 generates a URL request to be directed to the respective VOD server as described.

The handler 300 also parses the video layer size (step 416) and location (step 418) from the SDP file. There may be default locations and sizes in some applications. The handler directs a transparent section of the HTML or browser layer to be formed (step 420). The present invention is a windowless system where the screen consists of one HTML or browser layer. To display a video layer in this system, a section (or all) of the HTML or browser layer is cleared and filled with a transparent layer for the video layer to show there through. This reduces the complexity of STB 200 in terms of MPU cycles, memory overhead and graphics system 212 requirements.

At step 424, the handler 300 directs the front end to tune to the channel corresponding to the video signal to be shown in the video layer after parsing the channel from the SDP file at step 422. The channel may correspond to a VOD channel directed to the STB 200. The handler size the video layer at step 426 and specifics the location of the video layer on the screen at step 428.

It is noted that other events that cause the TV media handler 300 to activate. A channel may be selected via a remote control, keyboard, mouse, or front panel of the STB 200 for example. In this case, the event decoder of the handler 300 directs the TV state machine 310 to act accordingly. Other events may include Channel Up, Fast Forward, and on-screen display ("OSD") Program Info Display (such as the current settings of the STB 200).

In the TV media handler 300, the platform APIs 320 provide an abstraction layer to enable the TV Media Handler to interface with the STB 200. The platform APIs include the TV control 322, OSD 324, Front Panel Display 326, Timer Utility 328, and Video Scaling 332. The TV control section will provide an API to the rest of the TV media handler 300 that will abstract the functions of interacting with the actual platform tuning module and others. The On Screen Display (OSD) section, like the TV Tuning section, will provide an interface to the rest of the TV media handler that will abstract the functions and control of running the OSD. This subsection will receive commands through its interface and make the necessary drawing calls to the Spyglass Thin GIH to draw the information onto the correct area of the TV media handler's window. The From Panel Display APIs provides an abstract for the TV Media Handler module to control the visual display of the front panel.

The timer utility section provides a set of APIs for the TV Media Handler to set up timing specific events. The video scaling section provides the TV Media Handler 300 a method to perform video scaling and/or re-positioning the video window on screen. The content handler APIs 302 of the TV media handler 300 provide a communications channel between the TV media handler and the media handlers parent, either the Spyglass CTM or an HTML media handler. The API's also provide channels to the data sources (URL handlers) and subviews (gif/jpeg images).

As noted, when the TV medial handler is initialed by a selection in a HTML page, the returned data will be in the form of a session description protocol (SDP) file. In one embodiment, this resource will be returned with the content-type of video/mpeg. The TV media handler will begin reading the incoming SDP file and decode the data to set up the TV session. The set of parameters that are available in a SDP file include:

Session description
    v=(protocol version)
    o=(owner/creator and session identifier).
    s=(session name)
    i=*(session information)
    u=*(URI of description)
    e=*(email address)
    p=*(phone number)
    c=*(connection information—not required if included in all media)
    b=*(bandwidth information)
One or more time descriptions
    z=*(time zone, adjustments)
    k=*(encryption key)
    a=*(zero or more session attribute lines)
Zero or more media descriptions
Time description
    t=(time the session is active)
    r=*(zero or more repeat times)
Media description
    m=(media name and transport address)
    i=*(media title)
    c=*(connection information—optional if included at session-level)
    b=*(bandwidth information)
    k=*(encryption key)
    a=*(zero or more media attribute lines)
Window Size
    Window Width:Width Value
    WindowHeigh:HeightValue
    WindowXPos:Xposition
    WindowYPos:YPosition
Socket ID
    SocketID:SocketNumber
TV Commands
Service to tune
    ServiceID:Channel#
Service name
    Service Name:ChannelDescriptorString
Location of channel graphic (logo) resource.
    LogoURI:PathToLogoData
VOD Commands
Initial Data
    VODAssetID:AssetID
    SRMAddress:MachineIP (Connection Address to VOD SRM)
    VODApplicationID:ApplicationID
SSP Possible Data
    SSPSocket:SocketID
    SSPMpegProgram:ProgNumber
    SSPTransportID:TransportID
    SSPPhysicalResource:PhysicalResource
    SSPStreamIPAddress:IPAddress
    SSPStreamIPPort:IPPort
    SSPStreamID:StreamID
    SSPKeepAlive:PeriodInMinutes
LSCP Possible Data
    NPTTime:Milliseconds
    NPTNumerator:Numerator
    NPTDenominator:Denominator While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware (e.g., a software language other than Java, such as C++ or others may be used to implement the invention). As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution.

What is claimed is:

1. A method of controlling an audio video system, comprising:
   a) generating a user selectable media event in the system, the system presenting a first graphics page in which the media event appears along with user-selectable selector elements, the media event being live video;
   b) receiving a user selection to change the graphics page to a second graphics page different from the first graphics page, the second graphics page including user-selectable selector elements, at least some of which user-selectable selector elements on the second graphics page are different than the user-selectable selector elements on the first graphics page; and
   c) directing a continuing generation of the media event in the audio video system and the media event appearing in the second graphics page that includes the user-selectable selector elements on the second graphics page that are different than the user-selectable selector elements on the first graphics page, the media event being the same video as was presented with the first graphics page, a media event protocol indicating a first portion of the first graphics page to be made transparent, the first portion of the first graphics page being where the video is combined with the first graphics page such that the video appears in the first portion of the first graphics page, second portions of the first graphics page also appearing with the video being presented in a first portion of the second graphics page, the media event being processed while a user of the audio video system navigates to the second graphics page which does not necessarily refer to the media event, the video, when the user navigates from the first graphics page to the second graphics page, remaining visible in the second graphics page in a first portion of the second graphics page, the first portion of the second graphics page occupying the same location as the first portion of the first graphics page.

2. The method of claim 1, further comprising the step of parsing the media event protocol file and wherein step c) includes directing the generation of the media event in the media generation system based on the parsed media event protocol file.

3. The method of claim 1, wherein the system includes a television set top box.

4. The method of claim 3, wherein the media event protocol file includes the screen location for the video media event within a page of a Web Browser.

5. The method of claim 4, wherein the media event protocol file includes the height and width of the video media event within the page of the Web Browser.

6. The method of claim 5, wherein the media event protocol file includes the channel location of the video media event.

7. A method of controlling an audio video system, comprising:

a) generating a user selectable media event in the audio video system, the system presenting a first view in which the media event appears, the media event being live video;

b) receiving a user selection to change view to a second view different from the first view, the second view including the media event, the media event continuing as a single media event from the first view to the second view;

c) directing continuing generation of the media event in the media generation audio video system and the media event appearing in the second view, the media event being the same video as was presented with the first view, a computer data structure indicating a view location of the first view where the video is presented such that the video appears in the first view, the media event being processed while a user of the audio video system navigates to the second view, the video, when the user navigates from the first view to the second view, being visible in the second view.

* * * * *